United States Patent
Harvey et al.

(10) Patent No.: US 10,384,798 B2
(45) Date of Patent: Aug. 20, 2019

(54) TELESCOPING STOWAGE TUBE AND ROTATING HOSE REEL FOR CARGO BAY REFUELING SYSTEM

(71) Applicant: Carleton Life Support Systems, Inc., Davenport, IA (US)

(72) Inventors: Scott Harvey, Davenport, IA (US); Matt Lund, Davenport, IA (US)

(73) Assignee: Carleton Life Support Systems Inc., Davenport, IA (US)

( * ) Notice: Subject to any disclaimer, the term of this patent is extended or adjusted under 35 U.S.C. 154(b) by 395 days.

(21) Appl. No.: 15/430,639

(22) Filed: Feb. 13, 2017

(65) Prior Publication Data

US 2017/0233092 A1    Aug. 17, 2017

Related U.S. Application Data

(60) Provisional application No. 62/294,622, filed on Feb. 12, 2016.

(51) Int. Cl.
*B64D 39/02* (2006.01)
*B64D 39/00* (2006.01)

(52) U.S. Cl.
CPC ............ *B64D 39/02* (2013.01); *B64D 39/00* (2013.01)

(58) Field of Classification Search
CPC .............................................. B64D 39/00–04
USPC ........................................................ 244/135
See application file for complete search history.

(56) References Cited

U.S. PATENT DOCUMENTS

| | | | |
|---|---|---|---|
| 2,879,017 A | 3/1959 | Smith | |
| 2,973,163 A | 2/1961 | Goodliffe et al. | |
| 2,995,321 A | 8/1961 | Zeitler | |
| 3,674,049 A | 7/1972 | Macgregor | |
| 4,905,937 A * | 3/1990 | Spotswood | B64C 1/36 244/135 A |
| 5,393,015 A * | 2/1995 | Piasecki | B64D 39/00 244/135 A |
| 7,422,179 B2 | 9/2008 | Mouskis | |
| 7,878,455 B2 | 2/2011 | Adarve Lozano | |
| 8,118,261 B1 | 2/2012 | Schroeder | |
| 2006/0065785 A1 | 3/2006 | Enig et al. | |
| 2006/0273213 A1 | 12/2006 | Turk et al. | |

(Continued)

FOREIGN PATENT DOCUMENTS

FR    2648428    12/1990
WO    2007044021    4/2007

*Primary Examiner* — Marc Burgess
(74) *Attorney, Agent, or Firm* — Woods Oviatt Gilman LLP; Katherine H. McGuire, Esq.

(57) ABSTRACT

An aerial refueling system for refueling a receiver aircraft in flight comprises a hose reel assembly mounted onto a fuel supply aircraft's fuselage. The hose reel assembly has a rotatable drum defined by an outside diameter. A hose is wound around the drum and has an outlet end with a drogue affixed thereto. A telescoping stowage tube stores the outlet end of the hose and the drogue when the system is not in use and guides the outlet end and the drogue toward the receiver aircraft when the system is in use. The telescoping stowage tube has a forward end configured to be mounted on the hose reel assembly to receive the hose from the drum and an aft end adapted to be mounted to the door. As a result, the telescoping stowage tube may be extendable between a retracted stowed position and an extended position for refueling.

10 Claims, 2 Drawing Sheets

(56) References Cited

U.S. PATENT DOCUMENTS

2007/0181748 A1 8/2007 Mouskis
2012/0043424 A1 2/2012 Schroeder

* cited by examiner

TELESCOPING STOWAGE TUBE AND ROTATING HOSE REEL FOR CARGO BAY REFUELING SYSTEM

TECHNICAL FIELD

The present invention relates to a fuselage mounted aerial refueling system; and more particularly to a fuselage mounted aerial refueling system wherein the hose reel is secured to the fuselage while a stowage tube is secured to a movable door or ramp; and even more particularly to a fuselage mounted aerial refueling system wherein the hose reel is secured to the fuselage while a stowage tube is secured to a movable door or ramp, the stowage tube being configured to telescope between extended and retracted positions depending upon whether the movable door or ramp is in an open or closed orientation.

BACKGROUND OF THE INVENTION

Fuselage mounted refueling systems contain several common components regardless of the particular installation, including: a hose reel assembly to store and dispense a refueling hose, a stowage tube or other piece of equipment which holds the hose-end components when the system is not in use and guide the hose between the hose reel drum and the exit point through the aircraft skin or outer mold line (OML). Also included is a tunnel or other fixed location exit point where the hose passes through the OML and into the airstream.

Currently deployed systems generally fall into one of two categories depending on whether the equipment is mounted in the fuselage or on a movable door or ramp. In the former instance, existing systems include a hose reel assembly in a fixed orientation and location inside the fuselage and a single fixed exit point is provided through the aircraft OML. In the latter arrangement, the hose reel and other components are mounted on a cargo door or ramp, moving together from the stowed position with the door or ramp closed into the refueling position when the door or ramp is lowered (opened).

The ramp/door arrangement is peculiar to roll-on/roll-off type systems which are temporarily installed in multi-role aircraft. On any system incorporating a hose and some sort of drum to wind it on and off, performance and reliability require that the hose remain tangential to the drum outside diameter during winding on/off. On the ramp type systems described above, the hose drum equipment and the stowage tube/hose exit components are all mounted to the ramp to maintain the tangency described regardless of the ramp position or movement.

A serious limitation inherent in such systems to date, however, is the capacity of the ramp to support the size and weight of the entire refueling system in flight and in use. Further performance limitations result from the lack of structural rigidity inherent in a moving door or ramp, such as increased vibration and high loads created by hose tension being applied to the ramp or door rather than solid aircraft structure like the cargo bay floor.

SUMMARY OF THE INVENTION

In one aspect of the present invention, a removable refueling system may be installed and anchored securely to the non-moving aircraft structure (fuselage) while having the exit point through the aircraft OML move up and down with door/ramp movement, all the while maintaining the tangency of the hose guide/stowage tube to the drum. The ability to mount the hose reel assembly and associated equipment to the floor or other fixed structure increases the allowable system weight, minimizes the effect and interaction of other equipment such as the ramp, and enhances system performance by minimizing vibration and other detrimental effects. To that end, a telescoping mechanism has been added to the stowage tube to address the issues resulting from the OML exit point moving as the door/ramp moves and the distance between the OML and the drum changes.

In a further aspect of the present invention, a refueling system may allow the hose drum unit to rotate about the drum's central axis to thereby maintain tangency between the stowage tube and the drum O.D. during winding on/off of the hose. Several means could be employed to provide and control such rotation, such as but not limited to "slaving" the reel mounting hardware to the ramp door via a linkage to thereby insure that the drum will always be oriented for optimum performance as the door opens and closes.

Accordingly, the present invention is generally directed to an aerial refueling system for refueling a receiver aircraft in flight from a fuel supply aircraft having a door movable between an open orientation and a closed orientation. The system comprises a hose reel assembly mounted onto the fuel supply aircraft's fuselage with the hose reel assembly having a rotatable drum defined by an outside diameter. A hose is wound around the drum and has an outlet end and a drogue affixed to the outlet end. A telescoping stowage tube may be configured to store the outlet end of the hose and the drogue when the system is not in use and to guide the outlet end and the drogue toward the receiver aircraft when the system is in use. The telescoping stowage tube may have a forward end configured to be mounted on the hose reel assembly to receive the hose from the drum and an aft end adapted to be mounted to the door. As a result, the telescoping stowage tube may be extendable between a retracted stowed position when the door is in the closed orientation and an extended position when the door is in the open orientation.

Additionally, the telescoping stowage tube may include an outer housing slidably coupled to an inner housing and the hose within the telescoping stowage tube may lie along a plane tangential to the outside diameter of the drum. The hose reel assembly may also include a hose reel frame with the forward end of the telescoping stowage tube secured to the hose reel frame. Thus, the hose reel frame may pivot so as to maintain the tangential plane of the hose within the telescoping stowage tube relative to the outside diameter of the drum as the door moves between the open orientation and the closed orientation. The telescoping stowage tube may further translate along the hose reel frame in a plane parallel to the axis of rotation of the drum as the hose is wound off or wound onto the drum. To that end, the hose reel frame may include a lead screw and a serving gear nut may couple the forward end of the telescoping stowage tube to the lead screw. The serving gear nut may be configured to translate along the lead screw.

Still further, the aerial refueling system may further include a stowage tube mount fixedly secured to the door at a first end and pivotally secured to the aft end of the telescoping stowage tube at a second end. The stowage tube mount may further include a swivel with the swivel configured to move the aft end of the telescoping stowage tube as the telescoping stowage tube translates along the hose reel frame. The drogue may remain within the telescoping stowage tube until the drum is rotated to unwind the hose whereby the hose further includes a spring configured to bias the drogue out of the aft end of the telescoping stowage tube as the drum is rotated to unwind the hose.

Additional objects, advantages and novel aspects of the present invention will be set forth in part in the description which follows, and will in part become apparent to those in the practice of the invention, when considered with the attached figures.

BRIEF DESCRIPTION OF THE DRAWINGS

The above-mentioned and other features are advantages of this invention, and the manner of attaining them, will become apparent and be better understood by reference to the following description of the invention in conjunction with the accompanying drawings, wherein.

DETAILED DESCRIPTION

The following describes a specific application of a general aerial refueling system of the present invention on the V-22 Osprey cargo aircraft (the "V-22") wherein the refueling system is mounted to the cargo hold and lower cargo bay door, thereby converting the V-22 to a part-time tanker for refueling other aircraft. While shown and described with reference to the V-22, it should be understood by those skilled in the art that the telescoping stowage tube and rotating hose reel assembly of the present invention may be used on other platforms, such as weapon bay doors or other aircraft (commercial or military) having cargo bay doors where the system requires the stowage tube to be fixed to a rotating door and the hose reel assembly to be fixed to a permanent structural member of the aircraft.

As will be discussed in greater detail below, the telescoping stowage tube is required to safely eject the refueling assembly (i.e., drogue and refueling hose) into the airstream, with the maximum amount of clearance between the refueling assembly and aircraft structure. Because the hose reel assembly is mounted to a permanent structural member (e.g., the fuselage) and the telescoping stowage tube is mounted to the cargo bay door, the stowage tube angle changes as the cargo door opens and closes. This stowage tube angle change requires the stowage tube to extend while the door is down (open) for trail (unwind) and rewind hose reel operations so as to maintain a tangential relationship between the hose within the telescoping stowage tube and the hose reel drum. To that end, the stowage tube angle should match the natural catenary angle of the refueling hose so that all hose tension changes are transferred through the hose reel assembly, such as through the torque arm and boost cylinder of the hose reel assembly.

In the case of the V-22, the aircraft has a safety requirement that both the upper and lower cargo bay doors must be closed if the personnel in the cabin are required to ditch the aircraft (i.e., attempt to perform a controlled landing of the disabled or distressed aircraft). This safety requirement drives an additional mechanism to allow for further telescoping of the stowage tube assembly. That is, when the lower cargo door is in the up (closed) orientation, the aft end of the stowage tube must be forward of the cargo bay door so that the upper cargo bay door can fully close prior to ditching. However, when the lower cargo bay door is in the down (open) orientation, such as in preparation for and during refueling operations, the aft end of the stowage tube must be aft of the lower cargo bay door to ensure no contact is made with the door or other aircraft component during the trailing (unwinding) or the rewinding of the refueling hose. As will be described in more detail below, this actuation may be performed by, and without limitation solely thereto, a linear actuator, springs, cables and/or linkages slaved to the lower cargo bay door.

Figure 1:
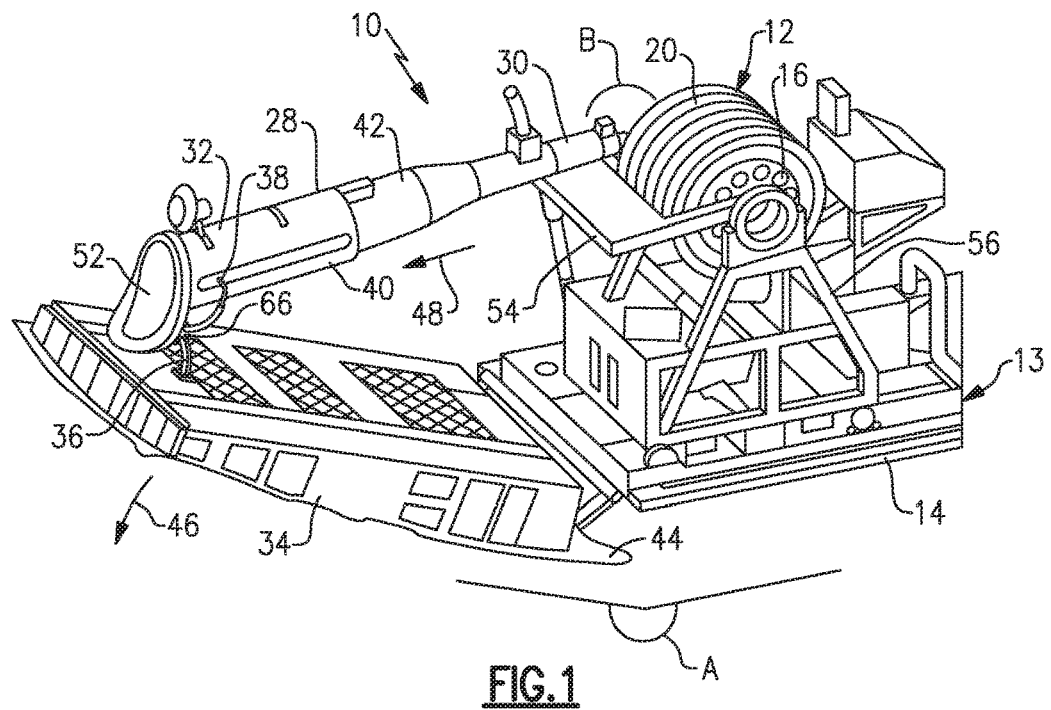
FIG. 1 is a partial schematic view of a refueling system in accordance with the present invention showing the refueling system in a stowed configuration.
Figure 2:
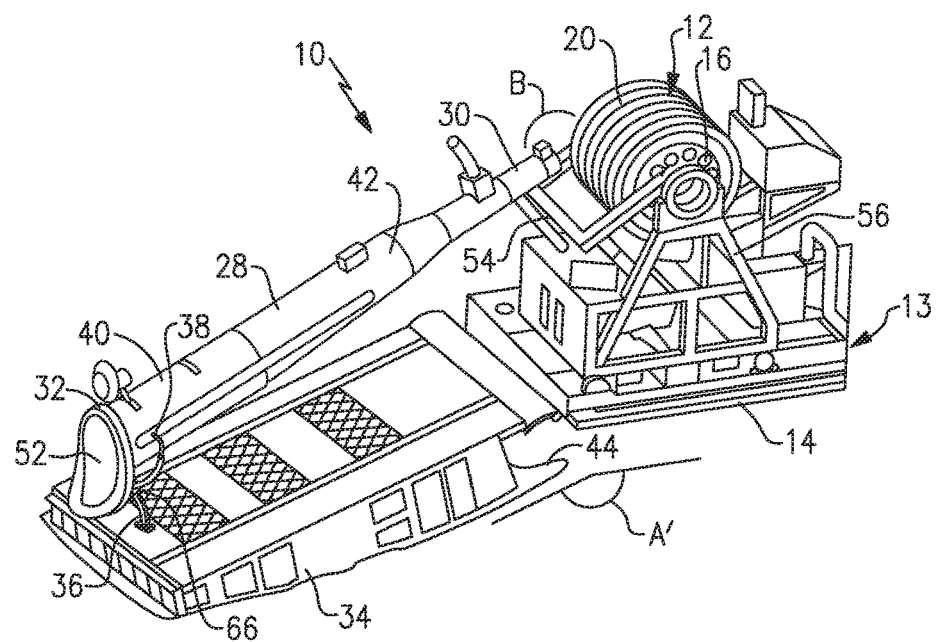
FIG. 2 is a partial schematic view of the refueling system shown in FIG. 1 showing the refueling system in a trailing configuration.
Figure 3:
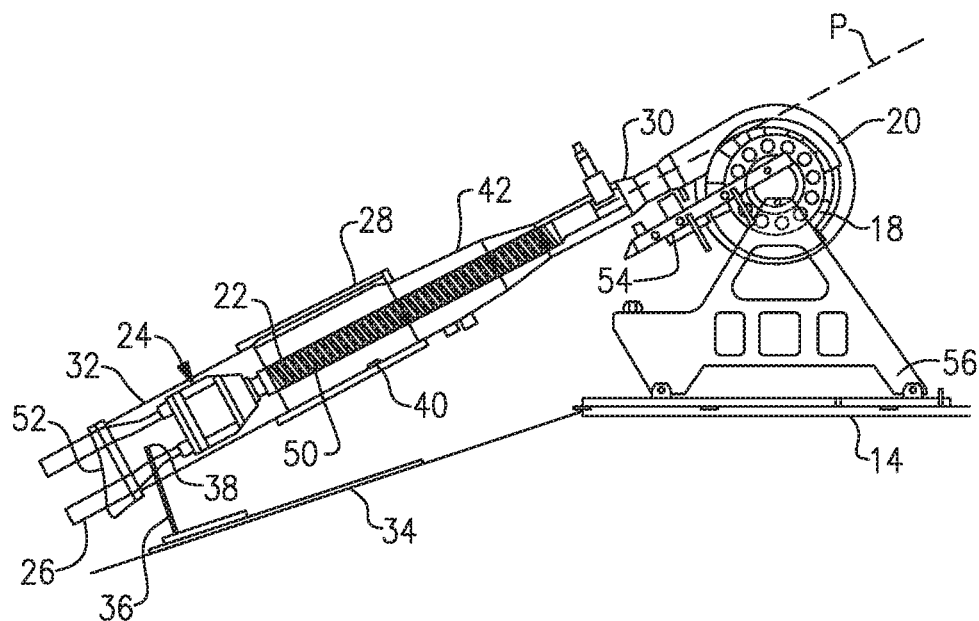
FIG. 3 is a cross section view of the refueling system shown in FIG. 2 with the drogue partially ejected from the telescoping stowage tube.

Turning now to the figures, and with specific reference to FIGS. 1-3, an aerial refueling system in accordance with the present invention is indicated by reference numeral 10. Aerial refueling system 10 is generally comprised of a hose reel assembly 12 mounted to a structural component of the fuel supply aircraft 13, such as fuselage 14. Hose reel assembly 12 includes a rotatable drum 16 defined by an outside diameter 18. Hose 20 is wound around drum 16 as is known in the art (see also FIG. 4). As can be seen most clearly in FIG. 3, aft end 22 of hose 20 is configured to carry a drogue refueling assembly 24 with inflatable drogue 26. Prior to ejection of drogue refueling assembly 24 during refueling operations or when aerial refueling system 10 is in a stowed condition (such as shown in FIG. 1), a portion of hose 20, including aft end 22 and drogue refueling assembly 24, is stored within telescoping stowage tube 28. Telescoping stowage tube 28 includes a forward end 30 configured to be mounted onto hose reel assembly 12 to receive hose 20 from drum 16 and an aft end 32 adapted to be mounted to a door/ramp of aircraft 13, such as cargo bay door 34. To that end, aft end 32 may be pivotally mounted to stowage tube mount 36 at pivot 38. In this manner, aft end 32 (and thus telescoping stowage tube 28) may pivot as cargo bay door 34 reciprocates between the closed orientation (FIG. 1) and the open orientation (FIGS. 2-3).

In one aspect of the invention, telescoping stowage tube 28 comprises an outer housing 40 slidably coupled to inner housing 42. In this manner, the length of telescoping stowage tube 28 may change, as will be discussed in greater detail below. It should be noted that, while being shown and described as overlapping concentric housings in sliding arrangement, telescoping stowage tube may be constructed in any suitable form. However, the sliding engagement of outer housing 40 with inner housing 42 is sufficiently rigid to accommodate lateral stresses exerted upon telescoping stowage tube 28 during use.

When deploying aerial refueling system 10 for inflight refueling operations, cargo bay door 34 moves from the closed orientation (FIG. 1) to an open orientation (FIGS. 2-3). As cargo bay door 34 pivots about hinge 44 (generally in the direction indicated by arrow 46), telescoping stowage tube 28 extends generally in the direction indicated by arrow 48 from a retracted stowed position (FIG. 1) to an extended position (FIGS. 2-3) as described above. With telescoping stowage tube 28 in its fully extended position, hose 20 may be unwound from drum 16 to direct refueling assembly 24 and drogue 26 in the trail position (i.e., extending outwardly from fuel supply aircraft 13 so as to safely couple with the receiver aircraft (not shown)) as is known in the art.

With reference to FIG. 3, to eject refueling assembly 24 and drogue 26 through telescoping stowage tube 28, hose 20 may include a spring 50 which is fully compressed in the stowed position to bias refueling assembly 24 and drogue 26 out exit orifice 52 defined by terminus of aft end 32 of telescoping stowage tube 28. When in the stowed position (FIG. 1), spring bias of spring 50 is maintained due to hose 20 being wound about drum 16. However, when hose 20 is commanded to the trail position after cargo bay door 34 has been opened and telescoping stowage tube 28 has been extended (FIGS. 2-3), drum 16 will rotate in the trail direction at a fixed speed to eject hose 20 through telescoping stowage tube 28. The bias stored within spring 50 will operate to push refueling assembly 24 and drogue 26 towards exit orifice 52. Once refueling assembly 24 reaches the airstream, drogue 26 will inflate and create drag on hose 20 while drogue 26 and hose 20 extend outwardly from fuel supply aircraft 13 toward the full trail position.

Because hose reel assembly 12 is mounted to fuselage 14 and aft end 32 of telescoping stowage tube 28 is mounted to cargo bay 34, the stowage tube angle changes as cargo bay door 34 opens and closes (compare angle A in FIG. 1 with angle A' in FIG. 2). To accommodate stowage tube angle changes, hose reel assembly 12 may be configured to rotate as cargo bay door 34 pivots about hinge 44 so as to keep the relative angle B between telescoping stowage tube 28 and hose reel assembly 12 substantially the same throughout movement of cargo bay door 34 and hose reel assembly 12. To that end, hose reel assembly 12 may include a hose reel frame 54 pivotally mounted onto mounting frame 56 of hose reel assembly 12. Pivoting control of hose reel frame 54 may be slaved to pivoting control of cargo bay door 34 such that angle B is maintained as cargo bay door 34 opens and telescoping stowage tube 28 extends from its retracted stowed position to the extended position as described above. In this manner, hose 20 may remain in a plane P that is tangential to outside diameter 18 of drum 16. By maintaining hose 20 in a tangential plane relative to outside diameter 18, hose wear properties may be improved and hose tension changes may be transferred through the structural components of hose reel assembly 12, such as though torque arm 58 and boost cylinder 60 (see FIG. 4). In one aspect of the present invention, drum 16 of hose reel assembly 12 will rotate around the fuel inlet (not shown) so that hard lines can be used to couple aerial refueling system 10 with a fuel storage tank (not shown) without any fuel leaks.

Figure 4:
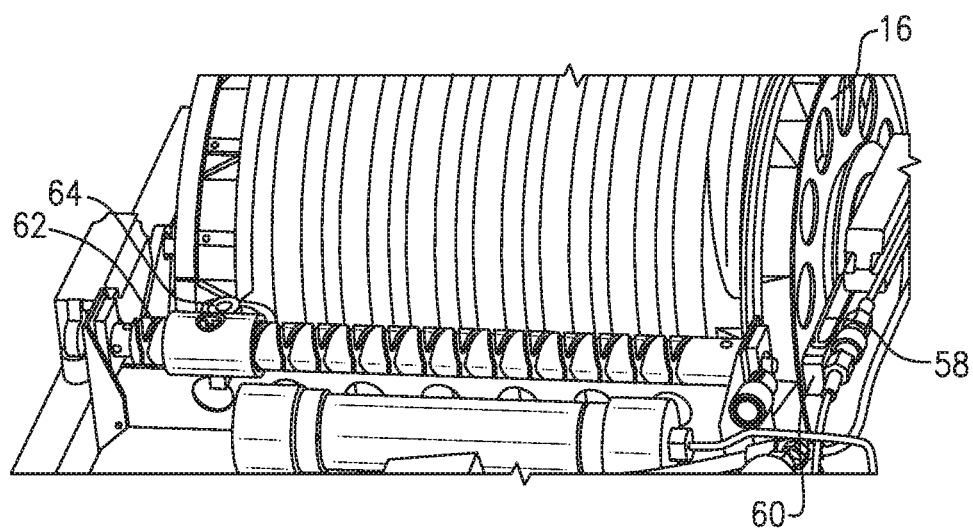
FIG. 4 is an expanded partial view of a hose reel assembly using within the refueling system shown in FIG. 1.

With reference to FIG. 4, hose reel frame 54 may include a lead screw 62 and serving gear nut 64 whereby forward end 30 of telescoping stowage tube 28 may be mounted to serving gear nut 64. Serving gear 64 is configured to translate along lead screw 62 as lead screw 62 is rotated. Lead screw 62 may be slaved to drum 16 rotator control such that gear nut 64 and forward end 30 of telescoping stowage tube 28 translate orthogonally to the winding/unwinding hose 20 from drum 16. Orthogonal translation of telescoping stowage tube 28 permits proper unwinding/rewinding of hose 20 onto drum 16. To prevent or minimize lateral stresses to telescoping stowage tube 28 during orthogonal translation of forward end 30, stowage tube mount 36 may include a swivel 66 configured to permit movement of aft end 32 as forward end 30 translates.

Although the invention has been described with reference to preferred embodiments thereof, it is understood that various modifications may be made thereto without departing from the full spirit and scope of the invention as defined by the claims which follow. While specific reference has been made to rotational movements of device components, it should be understood by those skilled in the art that such rotations may be reversed and that such teachings are within the scope of the present invention.

What is claimed is:

1. An aerial refueling system for refueling a receiver aircraft in flight from a fuel supply aircraft having a door movable between an open orientation and a closed orientation, the system comprising:
    a) a hose reel assembly mounted onto the fuel supply aircraft's fuselage, the hose reel assembly including a rotatable drum, the drum defined by an outside diameter;
    b) a hose wound around the drum of the hose reel assembly, the hose having an outlet end and a drogue affixed to the outlet end; and
    c) a telescoping stowage tube configured to store the outlet end of the hose and the drogue when the system is not in use and to guide the outlet end and the drogue toward the receiver aircraft when the system is in use, the telescoping stowage tube having a forward end configured to be mounted on the hose reel assembly to receive the hose from the drum and an aft end adapted to be mounted to the door,
    whereby, the telescoping stowage tube is extendable between a retracted stowed position when the door is in the closed orientation and an extended position when the door is in the open orientation.

2. The aerial refueling system of claim 1 wherein the telescoping stowage tube includes an outer housing slidably coupled to an inner housing.

3. The aerial refueling system of claim 1 wherein the hose within the telescoping stowage tube lies along a plane tangential to the outside diameter of the drum.

4. The aerial refueling system of claim 3 wherein the hose reel assembly includes a hose reel frame, the forward end of the telescoping stowage tube secured to the hose reel frame whereby the hose reel frame pivots so as to maintain the tangential plane of the hose within the telescoping stowage tube relative to the outside diameter of the drum as the door moves between the open orientation and the closed orientation.

5. The aerial refueling system of claim 4 wherein the telescoping stowage tube translates along the hose reel frame in a plane parallel to the axis of rotation of the drum as the hose is wound off or wound onto the drum.

6. The aerial refueling system of claim 5 wherein the hose reel frame includes a lead screw and a serving gear nut couples the forward end of the telescoping stowage tube to the lead screw, the serving gear nut configured to translate along the lead screw to move the forward end of the telescoping stowage tube as the drum rotates to wind off or wind on the hose.

7. The aerial refueling system of claim 5 further comprising:
    d) a stowage tube mount fixedly secured to the door at a first end and pivotally secured to the aft end of the telescoping stowage tube at a second end, the stowage tube mount further including a swivel, the swivel configured to move the aft end of the telescoping stowage tube as the telescoping stowage tube translates along the hose reel frame.

8. The aerial refueling system of claim 1 further comprising:
    d) a stowage tube mount fixedly secured to the door at a first end and pivotally secured to the aft end of the telescoping stowage tube at a second end.

9. The aerial refueling system of claim 1 wherein the drogue is configured to remain within the telescoping stowage tube until the drum is rotated to unwind the hose.

10. The aerial refueling system of claim 9 wherein the telescoping stowage tube further includes a stowage spring configured to bias the drogue out of the aft end of the telescoping stowage tube as the drum is rotated to unwind the hose.

* * * * *